United States Patent [19]
Akiyama

[11] 4,081,833
[45] Mar. 28, 1978

[54] SYNCHRONIZING SIGNAL SEPARATING CIRCUIT FOR TELEVISION VIDEO SIGNAL PROCESSING

[75] Inventor: Hideo Akiyama, Tokyo, Japan

[73] Assignee: Nippon Electric Co., Ltd., Tokyo, Japan

[21] Appl. No.: 658,021

[22] Filed: Feb. 13, 1976

[30] Foreign Application Priority Data
Feb. 17, 1975 Japan .................. 50-19624

[51] Int. Cl.² ........................... H04N 5/08
[52] U.S. Cl. ........................... 358/153; 358/172
[58] Field of Search .......... 178/7.3 R, 7.3 S, 7.3 DC, 178/7.5 R, 7.5 S, 7.5 DC, DIG. 26; 358/153, 172

[56] References Cited
U.S. PATENT DOCUMENTS 2,828,356  3/1958  Macovski ................. 178/7.3 S
3,569,844  3/1968  Lynn ........................ 178/7.3 S
3,881,055  4/1975  Gerot ....................... 178/7.3 S OTHER PUBLICATIONS
RCA Technical Note, No. 709, June 1967.

Primary Examiner—Robert L. Richardson
Attorney, Agent, or Firm—Hopgood, Calimafde, Kalil, Blaustein & Lieberman

[57] ABSTRACT

A synchronizing pulse separating circuit provides synchronizing pulser from an incoming composite television signal wave including such a wave formed of switched plural individual television signals of differing array D.C. level. The pulse separating circuit employs keyed clamping circuitry to clamp the peak synchronizing levels of the incoming wave to a reference level, and clipping circuitry directly coupled to the clamping circuitry to provide output synchronizing pulses responsive to the clamped incoming, such pulses. The output synchronizing pulse train is also employed to key on the clamp circuit.

5 Claims, 7 Drawing Figures

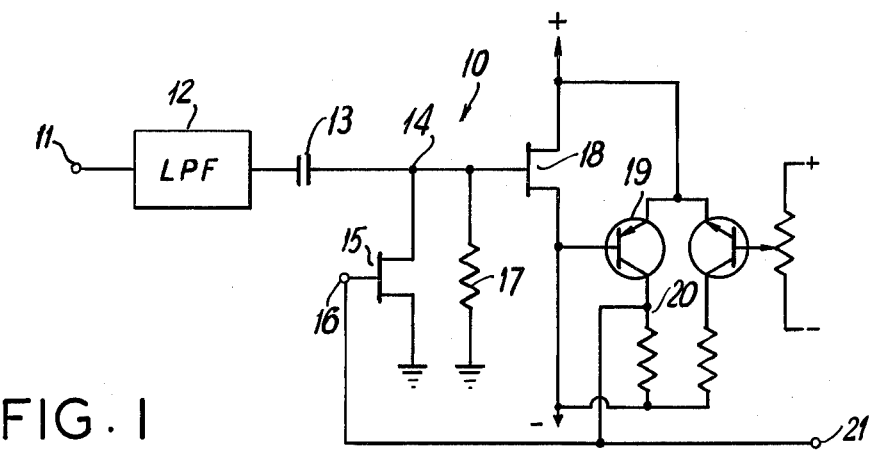
FIG. 1
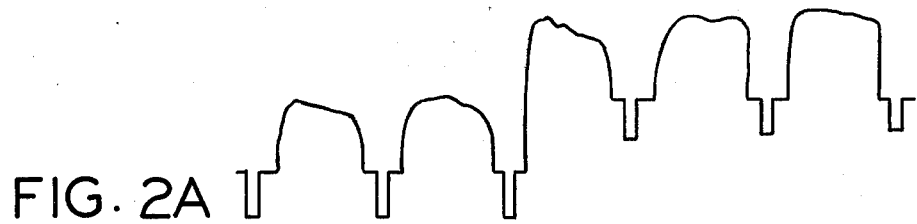
FIG. 2A
FIG. 2B
CLIPPING LEVEL
FIG. 2C
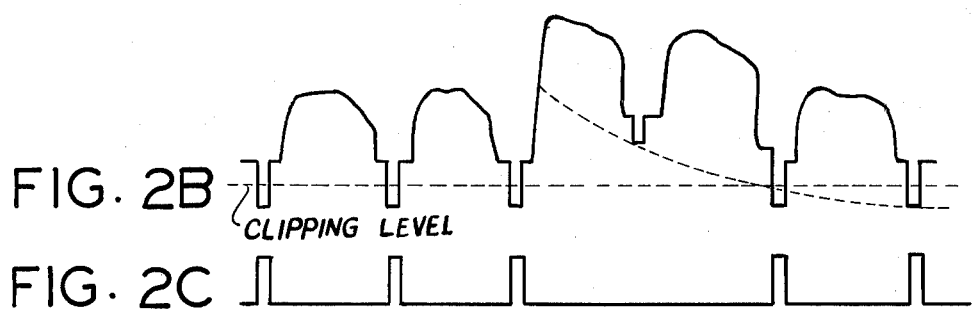
FIG. 2D
FIG. 2E
CLIPPING LEVEL
FIG. 2F

SYNCHRONIZING SIGNAL SEPARATING CIRCUIT FOR TELEVISION VIDEO SIGNAL PROCESSING

This invention relates to apparatus for separating a synchronizing signal from a composite color television video signal.

A composite color television video signal is composed of a video signal, and synchronizing signals such as a horizontal synchronizing signal and a vertical synchronizing signal. The separation of a synchronizing signal is easily achieved by using a clipper circuit so long as the peak level or the pedestal level of the synchronizing signal is fixed at a predetermined level. However, the peak level and the pedestal level tend to undergo level shifts when switching takes place between a video signal of one average picture level and that of another. To prevent this, the peak and pedestal levels must be clamped.

So-called pulse-clamping for peak or pedestal level clamping is best suited for those situations where the level variation, ham noise, or pedestal level variation is present in the input video signal.

A keying pulse is needed for this purpose. However, this is impossible for a synchronizing signal separating circuit to provide independently. To achieve high-quality pulse clamping, the keying pulse must be locally produced from the synchronizing signal. Therefore, a conventional synchronizing signal separating circuit adapted to pulse clamping comprises a feed-back loop with an indirect connection for feeding the separated synchronizing pulse back to a pulse clamper as the keying pulse. The feed back loop must have a small time constant, making it unstable when a sudden change occurs in the DC component of the video signal.

It is, therefore, an object of this invention to provide a synchronizing signal separating circuit for television video signals capable of withstanding wide-range input signal variations to achieve stable separation of the synchronizing signal.

According to this invention, there is provided a synchronizing signal separating circuit for television video signals comprising d.c. coupled feed-back loop in place of a.c. coupling. The d.c. coupling ensures a quick response and a stable transient response.

The features and advantages of this invention will be understood from the following detailed description of a preferred embodiment of this invention, taken in conjunction with the accompanying drawings, wherein:

FIG. 1 is a circuit diagram of an embodiment of this invention; and

FIGS. 2A and 2F are waveform diagrams of signals appearing at various parts of the embodiment shown in FIG. 1.

Referring to FIG. 1, a composite video signal is applied from an input terminal 11 through a low pass filter 12, employed for removing noise components. The output of filter 12 is supplied to a capacitor 13 in a keyed clamper circuit 10 composed of the capacitor 13, a switching transistor 15 and a leak resistor 17. At the junction between the clamp circuit capacitor 13 and transistor 15, a composite video signal is provided with its synchronizing signal peak level clamped at ground potential is provided.

The peak-level-clamped composite video signal is applied through a transistor 18 of a buffer amplifier to a clipper 19. The clipping level of the clipper 19 is such that only the synchronizing signal is allowed to appear at the collector electrode 20 of the transistor 19. Thus, the desired synchronizing signal is provided at an output terminal 21.

The synchronizing signal is also applied to the gate electrode 16 of the switching transistor 15 as a keying pulse for clamping. The delay time given to the keying pulse (the synchronizing pulse fed back) is shorter than the charge-up time of clamper 10. The discharge time constant of the clamper 10 depends on the resistance of the leak resistor 17.

Referring to FIG. 2A, the abrupt rise in the peak values of the synchronizing signal shows that the input signal sources are switched. The signals appearing at the points 14 and 20 under this situation are as shown in FIGS. 2B and 2C, respectively. The separated synchronizing signal at the point 20 (FIG. 1) is as shown in FIG. 2C. As shown, loss of a part of the synchronizing signals is unavoidable. The loss can be suppressed to two to three horizontal scanning periods by suitably selecting the discharge time constant of the clamper, which depends on the capacitor 13 and the leak resistor 17. This is a marked improvement over the conventional circuits where the loss extends as long as 20 horizontal scanning periods.

Referring to FIG. 2D showing an abrupt fall in the peak level, the signals at the points 14 and 20 (FIG. 1) are as shown in FIGS. 2E and 2F, respectively. Since the charge-up time constant is set at a value sufficiently smaller than one horizontal scanning period, the stable state is attained without the loss of the synchronizing signal.

In one practical illustrative of the circuit, illustrative implementation of the circuit, the source-drain resistance of the switching transistor 15 in the conductive state is 100 ohms; the capacitor 13, 100pF; and the leak resistor 17, 1 megohm. For such an arrangement, the charge-up time constant can be made as small as 0.01 microsecond. This is sufficiently shorter than one horizontal scanning period. On the other hand, the discharge time constant can be made 100 microseconds equal approximately to 1.5 times as large as one horizontal scanning period.

In this embodiment, the amplifier 18 for stabilizing the constants of the clamper 10 may be omitted where the input resistance of the clipper 19 is sufficiently high in comparison with the resistance of the leak resistor 17. Also, the electrodes of the transistor 15 and the leak resistor 17, grounded in the embodiment, may be set at any arbitrary reference level, which is chosen by the clipping level and the keying pulse level.

What is claimed is:

1. In combination in television wave synchronizing pulse separating apparatus, a source of reference potential, keyed clamping means for clamping synchronizing pulse peaks of the television wave to said reference potential responsive to an applied keying pulse, clipping means responsive to said clamped television wave synchronizing pulser for producing an output synchronizing pulse train, direct current feedback means for coupling said output synchronizing pulse train to said keyed clamping means to serve as said keying pulser, and D.C. coupling means coupling the output of said clamping means and the input of said clipping means.

2. A combination as in claim 1 wherein said keyed clamping means includes a series coupling capacitor, a controlled switch connecting said capacitor to said source of reference potential and controlled by said output synchronizing pulse train, and resistance means in parallel with said controlled switch.

3. A combination as in claim 2 wherein the time constant defined by said capacitor and the conduction impedance of said controlled switch is substantially shorter than an horizontal scanning period.

4. A combination as in claim 3 wherein the time constant defined by said capacitor and said shunt resistance means exceeds an horizontal scanning period.

5. A combination as in claim 4 wherein said D.C. coupling means includes a buffer D.C. amplifier.

* * * * *